INVENTORS
WILLIAM H. REES
NORMAN SOLOMON

BY Shanley & O'Neil

ATTORNEYS

INVENTORS
WILLIAM H. REES
NORMAN SOLOMON

BY *Shanley & O'Neil*

ATTORNEYS 3,627,502
TREAD PLATE AND MANUFACTURE
William H. Rees, Dearborn, and Norman Solomon, Oak Park, Mich., assignors to National Steel Corporation
Filed Oct. 1, 1968, Ser. No. 764,161
Int. Cl. B22f 5/00
U.S. Cl. 29—183
8 Claims

ABSTRACT OF THE DISCLOSURE

Tread plate has antiskid protuberances comprising flat-topped circular protrusions, and elongated convex projections radiating from the circular protrusions. The tread plate has improved walking comfort and antiskid properties, and its construction facilitates machining of the rolls which produce the tread plate. In roll machining antiskid protuberance-forming recesses are machined in the rolls by cutting a groove having a concave bottom surface, then aligning a drill over the groove and drilling a flat-bottomed hole, the bottom of which is contiguous to the deepest portion of the groove.

BACKGROUND OF THE INVENTION

Steel and other metal plates for walking surfaces in buildings, vehicles, stairs and other structures, are conventionally provided with antiskid protuberances which prevent slippage of shoes or vehicle tires. It is desirable that the protuberances be formed to maximize antiskid properties of the tread plate while also providing maximum walking comfort.

Among many previously proposed forms of tread plate (often termed floor plate) have been constructions including flat-topped, circular, antiskid protuberances interspersed with and spaced away from elongated anti-skid protuberances. Other proposals have included flat-topped, circular protuberances from which radiate elongated projections having flat tops coplanar with the flat top of the circular protuberance. Such forms of tread plate, like other prior art forms, have had some disadvantage or deficiency which has prevented their being entirely satisfactory, although the concept of flat-topped, circular antiskid protuberances is desirable in providing increased foot support area for walking comfort.

Many of the defects of prior art tread plate appear in producing the rolls of the rolling mills which produce the tread plate. Such rolls have many individual recesses, each of which is shaped to produce an antiskid protuberance on plate stock passed between the rolls. When it is desired to produce the recess with conventional machining tools, and when the form of the antiskid protuberance is such as to require a complex machining operation to form the recess, the difficulties are multiplied many times because of the large number of recesses in a roll and because the roll must frequently be redressed as a result of rolling surface wear.

In prior proposals employing flat-topped, circular protuberances, there have been serious machining difficulties. To form an isolated circular protuberance it is necessary to drill a flat-bottomed hole in the roll. Since the angular velocity of a drill progressively decreases toward the drill axis, the drilling is a tedious operation. To form a flat-topped, circular protuberance with radiating elongated projections having flat tops coplanar with the top of the circular protuberance, it is necessary to drill a flat-bottomed hole and further, it is necessary to machine an elongated, flat-bottomed cavity in the roll at some point in the machining operation. The machining of elongated, flat-bottomed cavities is also a relatively difficult operation.

In addition to presenting machining difficulties, many of the prior art forms of tread plate have not provided as much skid resistance and walking comfort as are desirable. Accordingly, a main object of the invention is the provision of novel tread plate which has improved antiskid and walking comfort properties, and which facilitates machining of the rolls which produce the tread plate.

Other objects of the invention will appear from the following detailed description which, together with the accompanying drawings, discloses two embodiments of the invention for purposes of illustration.

BRIEF DESCRIPTION OF THE DRAWINGS

In the drawings, similar reference characters denote similar elements throughout the several views, and.

DESCRIPTION OF THE ILLUSTRATED EMBODIMENTS

Figure 1:
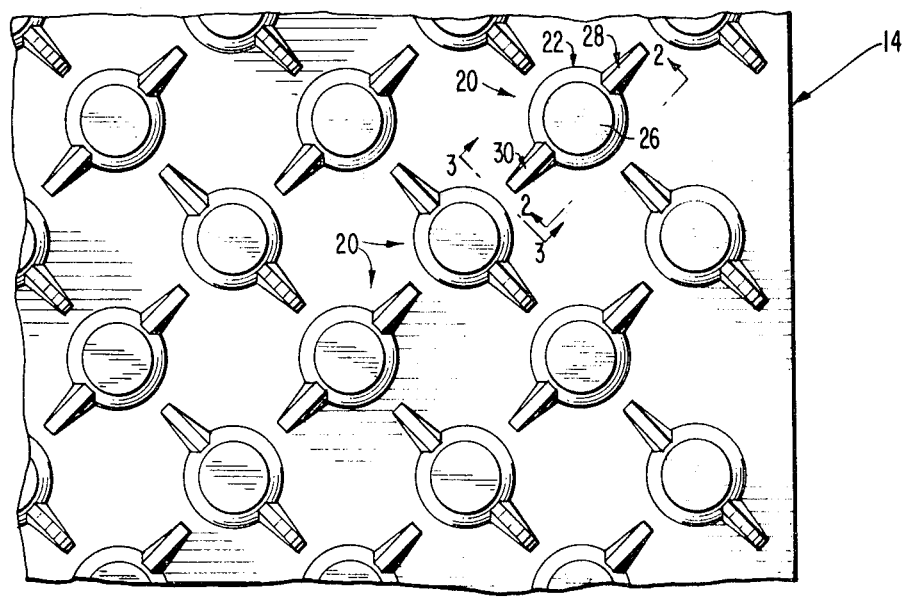
FIG. 1 is a plan view of tread plate embodying principles of the invention.
Figure 2:
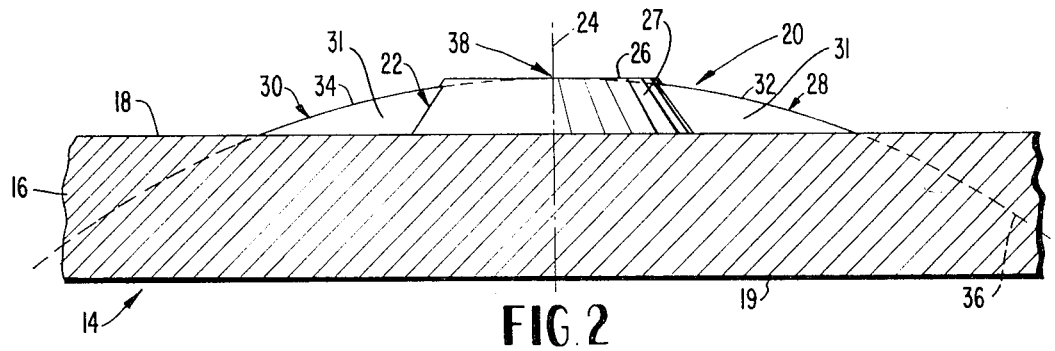
FIG. 2 is an enlarged, cross-sectional view on line 2—2 of FIG. 1.
Figure 3:
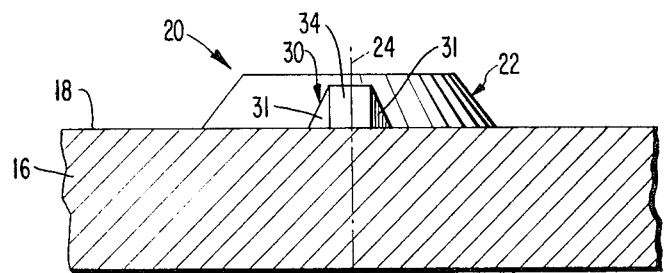
FIG. 3 is an enlarged view on section line 3—3 of FIG. 1.

In FIGS. 1–3, tread plate 14 includes a plate body 16 with flat top and bottom surfaces 18, 19 respectively. A plurality of antiskid members or protuberances 20 are carried by top surface 18. The antiskid protuberances are arranged in rows, formed integrally with plate body 16 in a unitary structure. All antiskid protuberances are identical in form, so description of one will impart understanding of all.

Each antiskid protuberance 20 includes an antiskid protrusion 22 extending from body surface 18 and having a generally circular cross-section in a plane parallel to the body surface. The shape of circular protrusion 22 is that of a frustum of a right circular cone.

Protrusion 22 has a central axis 24 normal to body surface 18, and a flat top surface 26 lying in a plane parallel to body surface 18. Flat top surface 26 intersects axis 24 at a location spaced a distance away from body surface 18. This distance is the maximum height of protuberance 20, and for example can be .09". Circular protrusion 22, for example can be .5" diameter at the base and ⅜" diameter at top surface 26. Protrusion 22 includes inwardly sloping side walls 27 which extend upwardly from body surface 18 and join with flat top surface 26 to define a circular corner or edge around the rim of circular protrusion 22.

Antiskid protuberance 20 includes two antiskid projections 28, 30 which extend upwardly from body surface 18, and extend radially from circular protrusion 22 along body surface 18. Projections 28, 30 extend in diametrically opposite directions from protrusion 22, and are elongated in a direction away from protrusion 22. For example, the length of protuberance 20 from end to end of projections 28, 30 can be 1.047". The projections of adjacent protuberances are at right angles to one another to provide high skid resistance in all directions along plate surface 18.

Each projection has side walls 31, which slope inwardly toward one another as their distance from body surface 18 increases. Projections 28, 30, have convex top surfaces 32, 34, respectively, which intersect body surface 18 at the tips of the projections. The corners made at the intersections of the top surfaces 32, 34 and the side walls of the projections provide antiskid grips for shoes and vehicle tires. Top surfaces 32, 34 are of uniform width along their length from the respective projection tip to circular protrusion 22.

Top surfaces 32, 34 of projections 28, 30 lie in a smoothly curved geometric surface, and have a uniform, uninterrupted, upwardly curved form between their respective intersections with body surface 18 and circular protrusion 22. The geometric surface is a surface of construction which is to be carefully distinguished from the surfaces of the tread plate, although the constructional surface includes projection top surface 32, 34. The surface of construction is used only to orient top surfaces 32, 34 relative to other elements of the tread plate. To amplify by example, in FIG. 2, a phantom line constitutes an end view of a segment of a cylindrical surface 36, which is a surface of geometric construction generated by rotation of a straight line perpendicular to the plane of the drawing about a parallel axis at a distance defining the radius of the cylinder. This radius, for example, can be 1 9/16″. Top surfaces 32, 34 of projections 28, 30, lie in cylindrical surface 36.

Uniform geometric surfaces employed to construct antiskid protuberances according to the invention are preferably cylindrical, but can assume smooth-curved configurations other than cylindrical, for example paraboloid. The controlling requirement is that the configuration be simple enough to be easily produced by a milling machine or like cutting device when machining a groove in the rolls which produce the tread plate, as discussed hereinbelow.

In FIG. 2, cylindrical surface 36 intersects central axis 24 of circular protrusion 22 at the same point 38 that planar top surface 26 intersects axis 24. This construction is advantageous in facilitating roll machining, as will appear hereinafter. Further, this construction is advantageous because top surfaces 32, 34 of the radial projections thus intersect side walls 27 of protrusion 22 at locations below top surface 26 of circular protrusion 22. This produces an uninterrupted or continuous circular corner around the top of the circular protrusion, for maximum antiskid properties.

Constructional surface 36 is oriented relative to body surface 18 such that a straight line which lies in surface 36 and is normal to the direction of projections 28, 30, is parallel to body surface 18 at all locations on surface 36 except at loci where it lies in the plane of surface 18. This orientation of surface 36 assures that projection top surfaces 32, 34 lie generally in the direction of the soles of shoes of persons walking on the plate and thus maximize foot support area. Top surfaces 32, 34 are of appreciable width (e.g. 1/16″), for maximum walking comfort.

Figure 4:
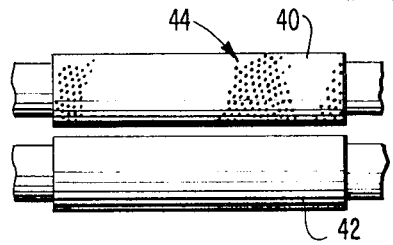
FIG. 4 schematically depicts rolls for producing the tread plate of FIG. 1.

Rolls of a rolling mill for producing tread plate 14 are indicated at 40, 42 in FIG. 4. Bottom roll 42 has a smooth peripheral rolling surface. Top roll 40 includes a plurality of recesses 44 which form antiskid protuberances 20 when flat-surfaced plate stock is passed between the rolls and a thickness reduction taken. Recesses 44 are distributed uniformly over the entire rolling surface of roll 40.

Figure 5:
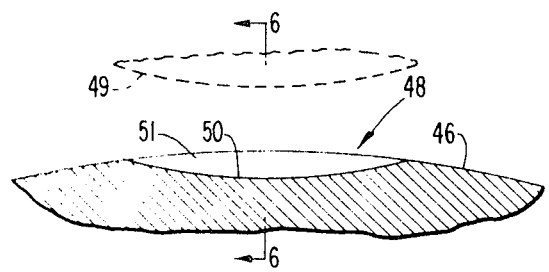
FIG. 5 diagrammatically illustrates a step in machining a roll in accordance with principles of the invention.
Figure 6:
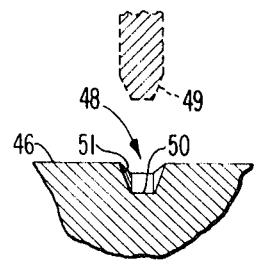
FIG. 6 is a cross-sectional view on line 6—6 of FIG. 5.

In making a roll for producing tread plate according to the invention, a roll having a smooth peripheral rolling surface 46 (FIGS. 5, 6) is provided. An elongated cavity or groove 48 is cut in the roll body through rolling surface 46 in a conventional manner by a milling machine having a rotary cutter indicated in phantom outline at 49. Groove 48 has a continuous, concave bottom surface 50 which intersects rolling surface 46 at its opposite ends and lies in a smoothly curved geometric surface which is a cylindrical surface of construction having a radius equal to that of constructional surface 36, discussed hereinabove. Bottom surface 50 being smoothly curved between intersections with rolling surface 46, groove 48 is cut much more easily than a groove having a flat bottom surface because less relative movement between the milling cutter and roll is required.

Groove 48 has sloping side walls 51, which produce sloping side walls 31 of projections 28, 30, when protuberance 20 is formed. It will be appreciated that a groove 48 is formed at every location on rolling surface 46 where an antiskid protuberance-forming recess is desired.

Figure 7:
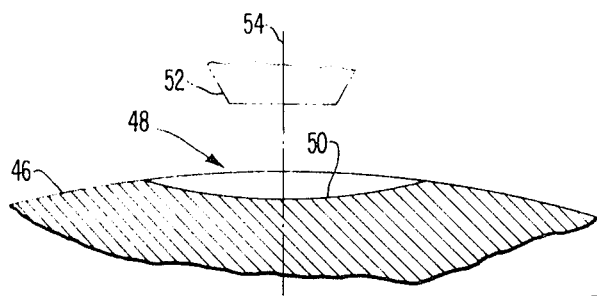
FIG. 7 schematically depicts a later step in roll machining.

After formation of groove 48, a drill, which can be of any suitable type of conventional flat-bottom design and is indicated in phantom outline at 52 in FIG. 7, is aligned with its central axis 54 extending radially relative to the roll and intersecting bottom surface 50 of groove 48. Drill 52 is aligned with axis 54 intersecting surface 50 at the mid-point of the length, and of the width, of the groove. Because of the uniformly curved shape of bottom surface 50, this is the deepest part of the groove. Since drill 52 is to produce a hole corresponding to circular protrusion 22, the drill tip is frustoconical and has the dimensions of the protrusion.

Figure 8:
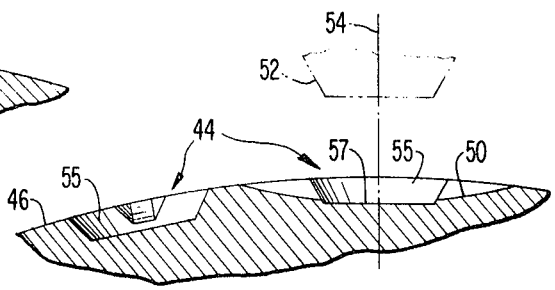
FIG. 8 schematically illustrates a still later step in roll machining.

The drill is then operated to drill a flat-bottomed, circular hole 55 (FIG. 8) through rolling surface 46 to a depth equal to the depth of the groove at the intersection of axis 54 and bottom surface 50. Since the central portion of the drill, where angular velocities are low, is within the confines of the groove until encountering bottom surface 50, it performs no cutting action until the hole is nearly complete. Hence, drilling is greatly expedited. The center point of the drill, having zero angular velocity, never at any time performs cutting action, since it never penetrates deeper than bottom surface 50. Parts of the drill tip located outwardly of the center but within groove 48 until encountering bottom surface 50 cut deeper than the groove, because of the cylindrical shape of bottom surface 50 and the alignment of the drill with its axis at the deepest part of the groove. By drilling to a depth such that flat bottom 57 of hole 55 intersects the axis of the hole (which is coincident with drill axis 54) at the same point that bottom surface 50 intersected the axis, it is assured that the center of the drill, having zero angular velocity, never performs any cutting action. Also, those cutting edges close to the center, having low angular velocities, perform only sufficient cutting to provide a flat bottom surface after encountering curved bottom surface 50.

The result of the foregoing machining technique in terms of the antiskid protuberance produced by the roll is that cylindrical surface 36, in which lie top surfaces 32, 34 of projections 28, 30, intersects axis 24 of circular protrusion 22 at the same point 38 which is the locus of intersection of top surface 26 and axis 24. Circular protrusion 22 thus is provided with an uninterrupted flat top surface for maximum walking comfort, and with an uninterrupted antiskid corner around its rim for maximum skid resistance.

Roll machining according to the invention is greatly simplified with respect to milling the initial groove and to drilling flat-bottomed holes. Since a roll may be redressed up to a dozen or more times during its service life, and since there are scores of antiskid protuberance-forming recesses to be machined in a roll, construction of rolls and tread plate in accordance with principles of the invention results in appreciable savings in machining time as well as produces tread plate which has a favorable combination of antiskid and walking comfort properties.

Figure 9:
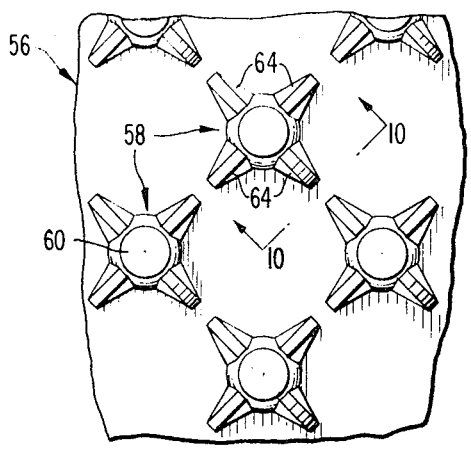
FIG. 9 is a plan view of another tread plate embodying principles of the invention.
Figure 10:
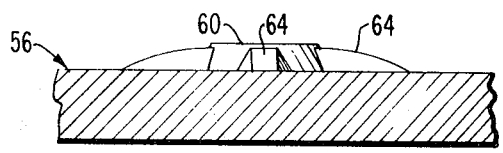
FIG. 10 is a cross-sectional view on line 10—10 of FIG. 9.

FIGS. 9 and 10 illustrate another tread plate 56 embodying principles of the invention. In tread plate 56, each antiskid protuberance 58 includes a central circular protrusion 60. Four radial projections 64 extend from circular protrusion 60 instead of the two radial projections 28, 30 of tread plate 14 of FIG. 1. Othewise, tread plate 56 is identical to tread plate 14.

In machining rolls to produce tread plate 56, identical grooves crossing at right angles are milled through the rolling surface. A drill is aligned at the intersection of the grooves, and a flat-bottomed hole is drilled to a depth equal to the maximum groove depth as discussed hereinabove, to provide a flat-topped central protrusion while minimizing necessary cutting by central cutting edges of the drill.

Although the invention has been described by reference to two illustrated embodiments, modifications of those embodiments can be made without departure from the principles of the invention. Such modifications are within the scope of the invention as defined by the appended claims.

What is claimed is:

1. Tread plate, comprising
a plate body having a surface, and
a plurality of spaced-apart antiskid members carried by the body,
each antiskid member including
an antiskid protrusion extending from said body surface and having a generally circular cross-section generally parallel to said body surface, and
an antiskid projection extending from said body surface and extending from the protrusion in a direction along said body surface,
the antiskid protrusion having a generally planar top surface and having side walls joined with said top surface,
the antiskid projection having a top surface lying in a smoothly curved geometric surface, intersecting the side walls of the antiskid protrusion, and intersecting said body surface,
the top surface of the antiskid projection curving convexly in a direction from its intersection with the side walls of the antiskid protrusion to its intersection with said body surface,
the top surface of the antiskid projection intersecting the side walls of the antiskid protrusion at a location below the top surface of the antiskid protrusion and above said body surface,
the antiskid protrusion having an uninterrupted, generally circular antiskid corner defined by the juncture of the side walls and top surface of the antiskid protrusion.

2. The tread plate of claim 1,
each antiskid member including
a second antiskid projection extending from said body surface and extending from the antiskid protrusion in a direction along said body surface opposite the direction of the first-named antiskid projection,
the second antiskid projection having a top surface lying in said smoothly curved geometric surface, intersecting said body surface, and intersecting the side walls of the antiskid protrusion at a location below the top surface of the antiskid protrusion and above said body surface,
the top surface of the second antiskid projection curving convexly in a direction from its intersection with the side walls of the antiskid protrusion to its intersection with said body surface.

3. The tread plate of claim 2,
the antiskid protrusion having a central axis generally normal to said body surface,
the top surface of the antiskid protrusion and said smoothly curved geometric surface intersecting said axis at a common location.

4. The tread plate of claim 3,
said smoothly curved geometric surface being cylindrical.

5. The tread plate of claim 2,
the antiskid projections being elongated and extending radially from the antiskid protrusion.

6. The tread plate of claim 2,
said smoothly curved geometric surface being oriented relative to said body surface such that a straight line which lies in said geometric surface between the intersection of the top surfaces of the projections and said body surface, and which is generally normal to the directions of the antiskid projections, is generally parallel to said body surface.

7. The tread plate of claim 1,
the top surface of the antiskid protrusion being generally parallel to said body surface.

8. The tread plate of claim 1,
the antiskid members being arranged in rows,
the antiskid projections of adjacent antiskid members being at right angles to one anohter.

References Cited

UNITED STATES PATENTS

| D. 88,185 | 11/1932 | Wheeler | D13—1 |
| 109,651 | 11/1870 | Neefus | 52—181 |
| D. 140,623 | 3/1945 | Harper | 94—5 X |

WINSTON A. DOUGLAS, Primary Examiner

O. F. CRUTCHFIELD, Assistant Examiner

U.S. Cl. X.R.

94—5